United States Patent [19]

Fukaya et al.

[11] Patent Number: 4,917,802
[45] Date of Patent: Apr. 17, 1990

[54] METHOD FOR TREATING WASTE WATER

[75] Inventors: Yukio Fukaya, Kanagawa; Kazuyuki Hatano; Kazuhiro Sainohira, both of Aichi, all of Japan

[73] Assignee: Onoda Autoclaved Light Weight Concrete Co., Ltd, Aichi, Japan

[21] Appl. No.: 130,875
[22] PCT Filed: Feb. 9, 1987
[86] PCT No.: PCT/JP87/00080
§ 371 Date: Oct. 6, 1987
§ 102(e) Date: Oct. 6, 1987
[87] PCT Pub. No.: WO87/04695
PCT Pub. Date: Aug. 13, 1987

[30] Foreign Application Priority Data

Feb. 10, 1986 [JP] Japan ................................ 61-25948
Jul. 18, 1986 [JP] Japan ............................... 61-168031

[51] Int. Cl.$^4$ ............................................. B01D 15/00
[52] U.S. Cl. ................................ 210/605; 210/500.1; 210/615; 210/621; 210/630; 210/906; 423/331
[58] Field of Search ................... 210/500.25, 603, 601, 210/617, 618, 630, 631, 691, 716, 903, 906, 908, 615, 616, 621, 500.1; 264/86; 422/116; 106/120; 423/331

[56] References Cited

U.S. PATENT DOCUMENTS

| 4,162,924 | 7/1979 | Kubo et al. ........................ 423/331 |
| 4,243,429 | 1/1981 | Tamura et al. ..................... 423/331 |
| 4,366,121 | 12/1982 | Krijgsman ......................... 422/110 |
| 4,395,357 | 7/1983 | Krämer et al. ..................... 423/331 |
| 4,414,111 | 11/1983 | Iwaisako et al. ................. 210/500.25 |
| 4,427,611 | 1/1984 | Oguri et al. ........................ 264/86 |
| 4,545,970 | 10/1985 | Krijgsman .......................... 106/120 |
| 4,560,479 | 12/1985 | Heijnen ............................. 210/617 |
| 4,707,270 | 11/1987 | Kobayashi et al. ................ 210/906 |

FOREIGN PATENT DOCUMENTS

| 3221287 | 12/1983 | Fed. Rep. of Germany ...... 210/906 |
| 0063762 | 6/1978 | Japan ................................ 210/906 |
| 0021052 | 2/1979 | Japan ................................ 210/617 |
| 0036331 | 3/1979 | Japan ................................ 106/120 |
| 0065693 | 6/1981 | Japan ................................ 210/906 |
| 0004227 | 1/1982 | Japan ................................ 210/906 |
| 58-185432 | 10/1983 | Japan ................................ 423/331 |
| 960119 | 9/1982 | U.S.S.R. ............................ 423/331 |

OTHER PUBLICATIONS

Japanese Patent Application #551013-160, 2-1976, Japan, Asahi Chemical Ino KK, "Treatment of Waste Water With Algae-to Remove Phosphoric Acid or Nitrogen".

Primary Examiner—Frank Spear
Assistant Examiner—Joseph Drodge
Attorney, Agent, or Firm—Bierman & Muserlian

[57] ABSTRACT

A method of treating raw water containing phosphorous and nitrogen compounds and organic matter in which the raw water is passed through an aerobic zone containing a porous material. Anaerobic treatment is carried out in the presence of a hydrogen donor. The porous material is tobermorite and/or xonotlite with a porosity of 50% to 90% and is produced by foaming and hardening a silica-based material, a lime-based material and water, and subjecting the porous material to hydrothermal synthesis. The order of the aerobic and anaerobic treatments may be varied.

10 Claims, 11 Drawing Sheets

METHOD FOR TREATING WASTE WATER

DESCRIPTION

1. Technical Field

This invention relates to a method for treating waste water such as animal urine, home waste water and sewage, which provides easy and efficient removal of organic substances, nitrogen and phosphorus.

2. Background Art

Organic waste water such as animal urine, home waste water and sewage causes eutrophication of lakes and inland seas, which can result in generation of green and red algae. Heretofore, a variety of treatment methods for the organic waste water, such as an activated sludge method, tricking filters, and a rotating biological contactor, have been proposed, and submerged filters have been often used in view of the installation area, efficiency of treatment, and maintenance.

In the dipping filter bed method, an aerobic filter bed tank is filled with a contact material, and waste water is introduced in the tank and aerated, thereby producing biomembranes on the surface of the contact material, and the waste water is cleaned by the function of microbes in the biomembranes. The contact material used in the submerged filters includes gravel, plastic pieces, and honeycomb tubes.

The submerged filters can remove organic substances, but are not sufficient to remove nitrogen compounds, and phosphoric acid and phosphates (hereinafter referred to as phosphorus), and discharging the treated water into a closed water area results in eutrophication, which leads to a major damage to the fisheries. Therefore, when organic wastes are treated by the submerged filters, separate denitrification and dephosphorization are required.

For the purpose, a biological denitrification method is normally used in combination with the submerged filters. In the biological denitrification method, an anaerobic filter bed tank is provided after the aerobic filter bed tank of the submerged filters, in which $NO_2^--N$ and $NO_3^--N$ coming from $NH_4^+-N$ through oxidation by the action of nitrification bacteria in the aerobic filter bed tank are reduced into $N_2$ gas by the action of denitrification bacteria under an oxygen-free condition. To obtain a sufficient effect of the denitrification, the oxidation of $NH_4^+-N$ into $NO_2^--N$ and $NO_3^--N$, or nitrification, must be sufficiently carried out in the aerobic filter bed tank of the submerged filters. However, the pH value in the aerobic filter bed tank decreases with progress of nitrification, and a neutralization with an alkali is required for the aerobic filter bed tank, which results in a complex control and a complicated structure of facilities with an increase in cost due to the use of chemicals.

Heretofore, a dephosphorization has been performed after the denitrification. Dephosphorization methods include a flocculation/precipitation method which uses metal salts such as salts of calcium, aluminum and iron to remove phosphorus in the form of metal phosphates, and a crystallization method which removes phosphorus by crystallizing it as hydroxyapatite in an alkali region in the presence of calcium. Either method requires a separate dephosphorization system or a separate dephosphorization tank.

As described above, to treat organic waste water, three steps including the removal of organic substances (submerged filters), denitrification and dephosphorization are indispensable at present. An example of such a treatment process for organic waste water will now be described with reference to FIG. 17. Referring to FIG. 17, organic waste water is primarily treated in a screen sand precipitation basin 01 and a vibrating sieve 02 to remove suspended substances and precipitates. The primarily treated waste water is diluted with water in a dilution tank 03, and then treated in an aerobic tank 04 using the submerged filters to remove organic substances and for sufficient nitrification while adjusting the pH value with an alkali agent. The treated waste water is added with methanol and agitated in an agitation tank 05, and then subjected to denitrification in an anaerobic tank 06. The denitrogenated waste water is treated in a re-aerobic tank 07 to further remove organic substances, and the result is transferred to dephosphorization process. The dephosphorization process comprises a pretreatment step consisting of a decarbonation by the addition of sulfuric acid in a decarbonation tank 08, a pH adjustment by the addition of gypsum and slaked lime in a pH adjusting tank 09, and precipitation of $CaCO_3$ and the like in a precipitation tank 010, and a crystallization/dephosphorization step to remove phosphorus as hydroxyapatite in a dephosphorization tank 011. The dephosphorized water is sterilized in a sterilization tank 012 and discharged out.

As described above, the prior art methods for treating organic waste water have required a number of apparatus and a high-level operation control.

On the other hand, the remove phosphorus which is a major cause of eutrophication of lakes and inland seas, the above described flocculation/precipitation method or crystallization method is also used In the flocculation/precipitation method, as shown in an example in FIG. 18, waste water containing phosphorus is added with slaked lime under agitation to increase the pH value of the waste water and to react phosphoric acid and calcium, thereby removing phosphorus in the form of calcium hydroxyapatite in a precipitation 022. Since the treated water after the primary precipitation 022 has a high pH value and contains a large amount of lime, it requires neutralization and calcium removal, normally through a post-treatment process consisting of a primary carbonation 023 up to a pH value of 9.3–10.0 at which calcium carbonate has the minimum solubility, a calcium cabonate precipitation 024, a secondary carbonation 025 up to neutralization, and a calcium filtration 026.

In the crystallization method, referring to FIG. 19 showing an example of the treatment process, waste water containing phosphorus, after carefully controlling the $Ca^{2+}$ concentration and $OH^-$ concentration (pH), is passed through a contact material layer 034 containing a crystallization seed such as calcium phosphate or calcium hydroxyapatite to remove phosphorus in the form of calcium hydroxyapatite. In the method, a pretreatment process for precisely controlling the $Ca^{2+}$ concentration and $OH^-$ concentration normally comprises a decarbonation 031 with sulfuric acid if the waste water contains carbonates, a pH/$Ca^{2+}$ adjustment 032 using slaked lime or gypsum, and a precipitation 033 to precipitate $CaCO_3$ and insoluble substances in the treated water.

The above described flocculation/precipitation method inevitably produces a large amount of sludge due to the use of a large amount of chemicals (slaked lime) and requires the complex post-treatment as described above. The crystallization method, on the other hand, requires the complex pretreatment for precisely controlling the $Ca^{2+}$ concentration and pH and the special contact material as the crystallization seed to crystallize calcium hydroxyapatite.

Thus, the prior art methods for treating waste water have been defective in that complex processes such as dephosphorization process are required and they have many problems regarding facilities, operation control, and treatment cost.

With a view to obviate all of the prior art defects of waste water treatment methods, it is a primary object of the present invention to provide a method for treating waste water which can perform removal of organic substances, denitrification and dephosphorization through simple processes.

DISCLOSURE OF INVENTION

To attain the above object, the inventors of the present invention have conducted various investigations and found that a composition consisting of hydrated calcium silicates provides an environment suitable for the activities of microbes in a biomembrane method for treating organic waste water, to deposit and remove phosphate ions and maintain a pH value adequate for nitrification, thereby accomplishing the present invention.

In accordance with the present invention which is based on the above findings and attains the above object, there is provided a first method for treating waste water, comprising a process for dephosphorization and nitrification in which waste water such as animal urine, home waste water and sewage is introduced into an aerobic filter bed tank filled with a porous contact material consisting mainly of hydrated calcium silicates having a porosity of 50–90% to treat the waste water by a biomembrane method, and a process for biological denitrification by introducing the nitrified waste water into an anaerobic filter bed tank. There is also provided a second method for treating waste water according to the present invention, in which a column or a tank is filled with a porous contact material consisting mainly of hydrated calcium silicates having a porosity of 50–90% to form a contact layer, and waste water containing phosphorus is passed through the contact layer.

Specifically, the porous contact material used in the present invention includes, for example, a molded material obtained by mixing a slurry consisting mainly of a silica-based material and a lime-based material with a foaming agent such as aluminum powder, and subjecting the mixture to a hydrothermal reaction under high temperature and pressure, a crushed material obtained by crushing the above molded material, having a porosity of 50–90%, and a granular or molded material obtained by hydrothermally treating a slurry consisting mainly of a silica-based material and a lime-based material under high temperature and pressure, crushing the hydrothermally treated material as needed, to obtain a powder, and pelletizing or molding the powder with air bubbles, having a porosity of 50–90%.

The hydrated calcium silicate is obtained by treating a mixture of a silica-based material and a lime-based material having a predetermined $CaO/SiO_2$ molar ratio (0.5–2.0) in an autoclave under a predetermined pressure and at a predetermined temperature by a conventional method known in the art. The silica-based material used in the present invention includes powder of quartzite, silica sand, cristobalite, amorphous silica, diatomaceous earth, ferrosilicon dust, and terra alba. The lime-based material includes powder of quicklime, slaked lime, and cement. The resulting hydrated calcium silicate consists of one or more substances selected from the group consisting of tobermorite, xonotlite, CSH gel, foshagite, gyrolite, and hillebrandite. Among these, tobermorite, xonotlite, and CSH gel are particularly preferable because they have a high pH buffering ability and a large specific surface area of 20–400 m²/g.

The porous contact material used in the present invention has a porosity of 50–90%. To obtain such a high porosity in the production of the contact material, a slurry consisting of the silica-based material and the lime-based material is added with a metallic foaming agent such as aluminum powder or a foaming agent such as air-entraining agent agent, and the mixture is hydrothermally treated under high temperature and pressure. The metallic foaming agent undergoes a chemical reaction to generate a gas, and the amount to be used depends on the air bubble inclusion into the slurry and the amount of water, but can be derived from the chemical reaction equation. The foaming agent specifically includes resin soaps, saponin, synthetic surfactants, hydrolyzed proteins, and polymer surfactants, and is primarily used to physically introduce air bubbles by the surface active action. The surface active agent is simply added to a material and agitated to generate bubbles, or used in a special agitation tank or foaming system to produce stable bubbles, which are then added to a material in an amount determined by calculating the required volume of bubbles. Prior to using the foaming agent, it is necessary to test the stability of bubbles and determine the amount of the foaming agent to be added. If the resulting hydrated calcium silicate has a small porosity, it can be crushed into a powder when it is a molded material, and then the powder is added with bubbles in the pelletizing or molding process to adjust the porosity. Specifically, the hydrated calcium silicate powder is added with a polymer binder such as an acrylic resin emulsion, and a foaming agent if necessary, and the mixture is kneaded and pelletized using a pan pelletizer or cast in a molding box. The pelletized hydrated calcium silicate can be dried by air drying or heating. The thus molded porous hydrated calcium silicate can be further crushed into a powder which is used in the contact material. To obtain the porous contact material with a high porosity, use of the cast molding method is recommended.

In the first method for treating waste water according to the present invention, organic waste water, which is primarily treated to remove suspended and precipitated matters, is passed without dilution through the aerobic filter bed tank filled with the porous contact material while being aerated, to simultaneously carry out removal of organic substances by the biomembrane method, removal of phosphorus, and nitrification of $NH_4^+$—N. The treated water containing $NO_2^-$—N and $NO_3^-$—N as the nitrification product of $NH4+$—N is introduced into the anaerobic filter bed tank and added with a hydrogen donor such as methanol, where $NO_2^-$—N and $NO_3^-$—N are anaerobically reduced to $N_2$ by the function of denitrification bacteria, thus performing biological denitrification.

The porous contact material filled in the aerobic filter bed tank has a fine surface texture of hydrated calcium silicate crystals or gel, which facilitates immobilization of bacteria and formation of the biomembrane and can relieve the drop in pH due to lower fatty acids such as lactic acid, butyric acid, and acetic acid as decomposition products (metabolic products of the bacteria) of organic substances to obtain a weak alkalline condition of pH 8-9, which is the optimum pH for the bacteria. Thus, the aerobic filter bed tank used in the present invention provides an enhanced activity of bacteria and protozoans which contribute to decomposition of organic substances and nitrification bacteria which perform nitrification, thereby enabling treatment at a high load an eliminating the need for dilution even for treating waste water of a high concentration such as urine from general pigsties.

Dephosphorization in the aerobic filter bed tank is performed by the following functions. The porous contact material in the aerobic filter bed tank supplies $Ca^{2+}$ ions required for the deposition of calcium hydroxyapatite from the hydrated calcium silicate crystals or gel and, by the pH buffering function of the contact material, maintains a stable condition of pH 8-9 even with a low or fluctuated pH value of the waste water. Thus, phosphate ions in the waste water react with the $Ca^{2+}$ ions and are deposited in the form of calcium hydroxyapatite on the surface of the contact material. The pores in the porous contact material serve to disturb the single-direction flow of the waste water and reduce the flow rate of the waste water on the surface of the contact material, thereby accelerating the deposition or growth of calcium hydroxyapatite produced by the reaction of phosphate ions and $Ca^{2+}$ ions. Although the porous contact material does not contain any crystal seed similar to calcium phosphate or calcium hydroxyapatite, it has an adsorption ability which absorbs calcium hydroxyapatite produced in the initial stage of passing the waste water to produce a surface structure suitable for the nucleation of calcium hydroxyapatite and to form calcium hydroxyapatite nuclei in the fine pores.

The porous contact material after treating waste water was observed using a scanning electron microscope and found to have numerous bacteria deposited and living in the pores and on the surface, and irregular crystals which were identified as calcium hydroxyapatite by means of an EPMA (X-ray microanalyzer).

As obvious from the above described fact, the fine pores and gaps of the porous contact material have a substantial effect on the deposition of bacteria and dephosphorization. The porous contact material used in the present invention has a porosity of 50-90%, preferably 60-80%, in the view of the bacterial deposition and dephosphorization. When the porosity of the porous contact material is less than 50%, the specific surface area is too small to obtain a sufficient bacterial deposition and a high dephosphorization rate. When the porosity of the porous contact material exceeds 90%, the contact material is liable to float while passing waste water through the aerobic filter bed tank and aerating, resulting in a considerable reduction in strength, with a reduced pH buffering ability and a decreased durability of the dephosphorization effect.

The size of the porous contact material used in the present invention also greatly relates to the dephosphorization ability. When the contact material is smaller than 0.5 mm in diameter, it is liable to be clogged with SS and deposited crystals and cannot be used for an extended period of time. Too large size of the contact material, on the other hand, results in a reduced removing rate due to decreased contact areas. Therefore, the porous contact material used in the present invention is 0.5-10 mm in diameter.

As described above, the first method for treating waste water according to the present invention provides efficient removal of organic substances, nitrogen, and phosphorus using a simple procedure with easy maintenance and control, and can treat even waste water of a high concentration such as animal urine and factory waste water at a high load thereby providing a simple, compact treating system.

The second method for treating waste water according to the present invention utilizes the aforementioned dephosphorization function of the porous contact material, in which waste water is passed as it is through a layer of the porous contact material filled in a column or a tank.

The second method for treating waste water according to the present invention can be applied to the aforementioned organic waste water or that treated by the primary treatment to remove solid substances, or to the organic waste water treated by the first method for treating waste water according to the present invention when dephosphorization is incomplete by the first method, or the waste water containing phosphorus other than the organic waste water.

The porous contact material used in the second method for treating waste water according to the present invention is the same as the above described porous contact material.

As described above, the second method for treating waste water according to the present invention can efficiently remove phosphorus using a simple and easy procedure with easy maintenance and control, and provides easy, economical treatment of factory waste water and sewage, as well as medium-to-small-scale dephosphorization treatment, which has formerly been difficult to perform such as for animal urine or miscellaneous home waster water.

The porous contact materials used in the first and second methods for treating waste water according to the present invention have a function to absorb heavy metals, and can remove such heavy metals together with organic substances and phosphorus contained in organic waste water.

The used porous contact materials in the methods can be reused as a silica-lime-based fertilizer or a soil improving material, thus providing an enhanced economy.

BEST MODE FOR CARRYING OUT THE INVENTION

Figure 1:
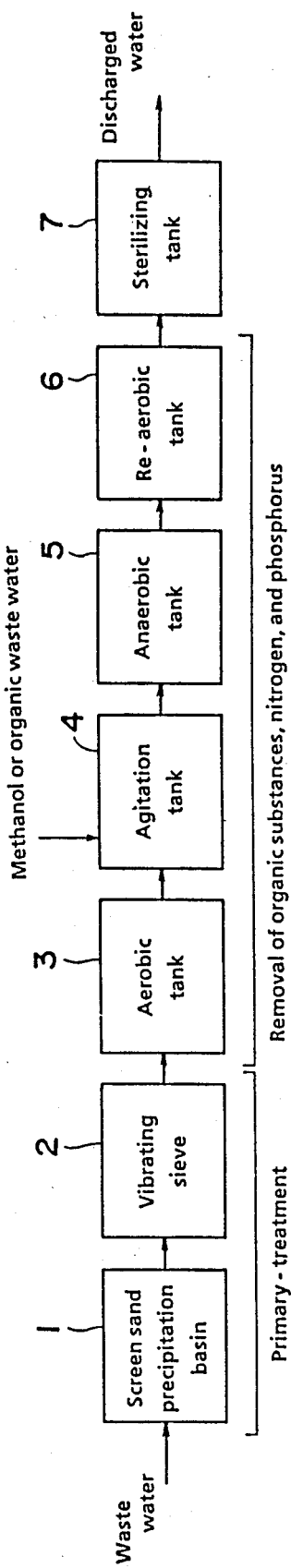
FIG. 1 and FIG. 2 are process flow sheets showing an embodiment of the first method for treating waste water according to the present invention.
Figure 2:
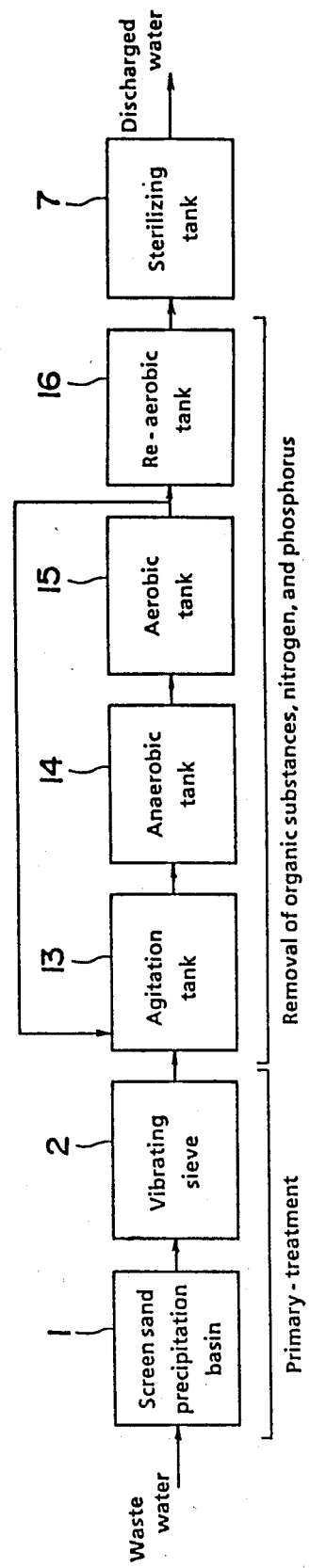

The method for treating waste water according to the present invention will now be described in detail with reference to the drawings. FIG. 1 and FIG. 2 show an example of the first method for treating waste water according to the present invention.

The example shown in FIG. 1 uses an anaerobic filter bed tank after an aerobic filter bed tank. Referring to FIG. 1, organic waste water which is primary-treated through a screen sand precipitation basin 1 and a vibrating sleeve 2 is introduced into an aerobic tank 3 (aerobic filter bed tank) filled with the porous contact material, where the waste water undergoes removal of organic substances, dephosphorization and nitrification. The waste water is then fed to an agitation tank 4, where the waste water is added with methanol or organic waste water. The waste water mixture is denitrogenated in an anaerobic tank 5 (anaerobic filter bed tank), and discharged through a re-aerobic tank 6 and a sterilizing tank 7.

FIG. 2 shows an example of a recirculation-type treatment process. Referring to FIG. 2, organic waste water treated in the screen sand precipitation basin 1 and the vibrating sieve 2 is fed through an agitation tank 13 and an anaerobic tank 14 to an aerobic tank 15 filled with the porous contact material, and then recirculated to the agitation tank 13, thereby performing dephosphorization and denitrification. The treated waste water is discharged through a re-anaerobic tank 16 and the sterilizing tank 7.

As can be seen from the example, the method for treating waste water according to the present invention provides a considerable reduction in number of steps compared to the prior art methods, with easy operation and control.

Figure 3:
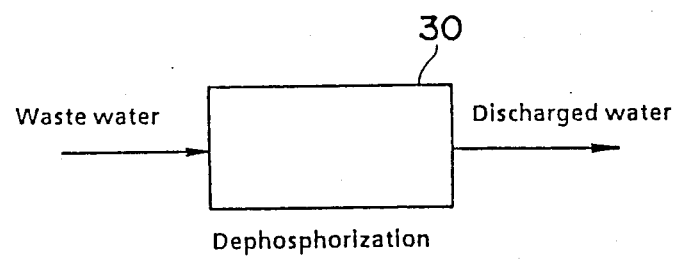
FIG. 3 is a process flow sheet showing the second method for treating waste water according to the present invention.

FIG. 3 shows an example of the second method for treating waste water according to the present invention. Referring to FIG. 3, waste water containing phosphorus can be passed through a porous contact material layer 30, without pretreatment such as pH adjustment required for the prior art crystallization method. The treated water is nearly neutral with a pH value of 8-9 with no sludge contained, thus requiring no post-treatment.

The second method for treating waste water according to the present invention can perform dephosphorization even for waste water having a high phosphate concentration, provided, however, that the flow rate of the waste water must be adjusted according to the phosphate concentration of the waste water, for example, a flow rate of 1 ton/day.m$^3$ for a phosphate concentration of 500 mg/liter, and 6 tons/day.m$^3$ for 50 mg/liter, with a dephosphorization rate of over 90%.

The porous contact material used in the second method for treating waste water according to the present invention for an extended period of time, having a decreased dephosphorization effect, can be reused as a silica-lime-based fertilizer and a phosphoric fertilizer, or as a material for phosphorus production, thus providing an improved economy.

An example of production of the porous contact material used in the method for treating waste water according to the present invention will now be described.

PRODUCTION EXAMPLES OF POROUS CONTACT MATERIAL

(1) CSH gel contact material

A mixture of 4 parts by weight of quartzite powder, 2 parts by weight of quicklime powder, 1 part by weight of slaked lime powder, and 3 parts by weight of a normal Portland cement ($CaO/SiO_2$ molar ratio = 1.5), with 0.008 part by weight of aluminum metal powder was added with 7 parts by weight of water to obtain a slurry. The slurry was poured into a molding box, which was allowed to stand for 4 hours and then released from the molding box. The molded material was crushed with a rotary brush and pelletized with a pan pelletizer into a particle diameter of 5-10 mm. The pelletized material was hydrothermally treated in an autoclave at a temperature of 150 degrees C. under a pressure of 5 atm for 10 hours to obtain a porous contact material. The resulting porous contact material had a porosity of 70%.

(2) Tobermorite contact material

A mixture of 5 parts by weight of quartzite powder, 2 parts by weight of quicklime powder, and 3 parts by weight of a normal Portland cement ($CaO/SiO_2$ molar ratio = 0.8), with 0.008 part by weight of aluminum metal powder was added with 7 parts by weight of water to obtain a slurry. The slurry was poured into a molding box, which was allowed to stand for 4 hours and then released from the molding box. The molded material was hydrothermally treated in an autoclave at a temperature of 180 degrees C. under a pressure of 10 atm for 10 hours. The hydrothermally treated molded material was crushed with a crusher and sieved to obtain a porous contact material of 5-10 mm in particle diameter. The resulting porous contact material had a porosity of 75%.

(3) Xonotlite contact material

Quartzite powder and quicklime powder were mixed so that the $CaO/SiO_2$ molar ratio was 1.0, and the mixture was dispersed into water of 10-times the weight of the solid components to obtain an aqueous slurry. The slurry was hydrothermally treated in an autoclave at a temperature of 210 degrees C. under a pressure of 20 atm for 10 hours under agitation. The thus obtained dry xonotlite powder was mixed with 4-times the xonotlite weight of an acrylic resin emulsion (solid content: 10%), kneaded, pelletized, and dried and solidified at 110 degrees C., which was then sieved to obtain a porous contact material of 5-10 mm in particle diameter. The resulting porous contact material had a porosity of 73%.

(4) Tobermorite contact materials with different porosities

In the above described production example (2), amounts of the aluminum metal powder and water were varied to obtain different tobermorite contact materials as shown in Table 1.

TABLE 1

| Aluminum (part by wt.) | 0 | 0 | 0 | 0.008 | 0.01 |
|---|---|---|---|---|---|
| Water (part by wt.) | 3 | 4 | 7 | 7 | 7 |
| Porosity (%) | 36 | 48 | 61 | 75 | 82 |

(5) CSH gel contact material

A slurry obtained with the same formulation as in the above production example (1) was poured into a molding box, which was allowed to stand for 4 hours and then released from the molding box. The molded material was hydrothermally treated in an autoclave at a temperature of 150 degrees C. under a pressure of 5 atm for 10 hours. The hydrothermally treated molded material was crushed with a crusher and sieved to obtain a porous contact material of 2.5-5 mm in particle diameter. The resulting porous contact material had a porosity of 72%.

(6) Tobermorite contact material

A molded material obtained using the same method as in (2) above was crushed with a crusher and sieved to obtain a porous contact material of 2.5-5 mm in particle diameter. The resulting porous contact material had a porosity of 75%.

(7) Xonotlite contact material

Dry xonotlite powder obtained using the same method as in (3) above was mixed with 4-times the xonotlite weight of an acrylic resin emulsion (solid content: 10%), kneaded, pelletized, and solidified at 110 degree C., which was then sieved to obtain a porous contact material of 2.5-5 mm in particle diameter. The resulting porous contact material had a porosity of 73%.

(8) Tobermorite contact materials with different porosities

In the above described production example (6), amounts of the aluminum metal powder and water were varied to obtain different tobermorite contact materials as shown in Table 2.

TABLE 2

| Aluminum (part by wt.) | 0 | 0 | 0 | 0.008 | 0.01 | 0.02 |
|---|---|---|---|---|---|---|
| Water (part by wt.) | 3 | 4 | 7 | 7 | 7 | 7 |
| Porosity (%) | 36 | 48 | 61 | 75 | 82 | 88 |

(9) Xonotlite contact materials with different porosities

In the above described production example (7), bubbles produced using Vinsol (manufactured by Yamaso Kagaku) as a foaming agent by a foaming machine were mixed to the kneaded material prior to pelletizing in amounts of 80 volume % and 160 volume %, respectively, to the volume of the kneaded material and other steps were operated same as the production example (7) to obtain porous contact materials with different porosities as shown in Table 3. For the formulation with 160% bubbles, the mixture was poured into a molding box, and dried and solidified together with the molding box.

TABLE 3

| Bubble added (%) | 0 | 80 | 100 |
|---|---|---|---|
| Porosity (%) | 73 | 85 | 91 |

The material with no bubbles added was that produced in the production example (7).

Test examples showing effects of the first method for treating waste water according to the present invention will now be described.

TEST EXAMPLE 1

Figure 4:
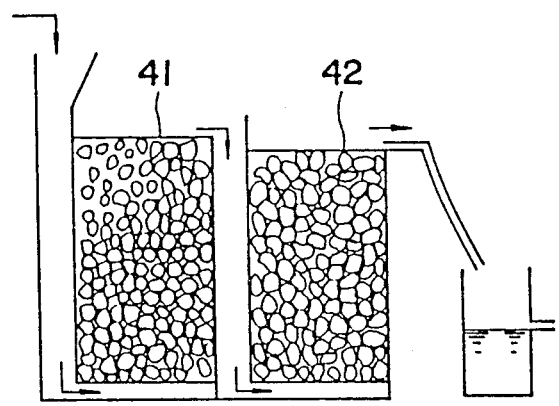
FIG. 4 is a schematic view showing a system used in test examples (test examples 1 and 2) of the first method for treating waste water according to the present invention.

Referring to FIG. 4, primary-treated waste water of pig urine, which was previously treated through solid-liquid separation and a 0.3 mm-diameter steel vibrating sieve, was passed in the upward direction through a first tank 41 having dimensions of 200×150×310 mm and a second tank having dimensions of 200×150×290 mm, both tank being filled with the porous contact material, and aerated from the bottoms of tanks 41 and 42 at a flow rate of 500 ml/min to check the properties of different types of porous contact materials. In test examples A-1, A-2, and A-3, the first and second tanks 41 and 42 were filled with the porous contact materials produced in the above production examples (1), (2), and (3), respectively, and the primary-treated waste water was passed through the tanks at a rate of 10 liters/day.

For comparison, commercial gravel, pumice, limestone, and polypropylene of 5-10 mm in particle size were used in place of the porous contact material in comparison examples B-1, B-2, B-3, and B-4, respectively.

During a 2 or 3-month operation, treated water samples of the test examples A-1 to A-4 and comparison examples B-1 to B-4 were measured four times for transparency, pH, BOD, and T-P (total phosphorus), and $NH_4^+$—N, $NO_2^-$—N, and $NO_3^-$—N concentrations, and the measurements were averaged for each example. The results are shown in Table 4.

TABLE 4

| | Transparency (cm) | pH | BOD (mg/l) | T-P (mg/l) | $NH_4^+$—N (mg/l) | $NO_2^-$—N (mg/l) | $NO_3^-$—N (mg/l) |
|---|---|---|---|---|---|---|---|
| Primary-treated | | | | | | | |

TABLE 4-continued

|  |  | Transparency (cm) | pH | BOD (mg/l) | T-P (mg/l) | $NH_4^+$—N (mg/l) | $NO_2^-$—N (mg/l) | $NO_3^-$—N (mg/l) |
|---|---|---|---|---|---|---|---|---|
| pig urine |  | 1 | 8.2 | 1820 | 48.5 | 716 | ND | ND |
| Test | A-1 | 33 | 8.2 | 68 | 3.2 | ND | 32 | 582 |
| example | A-2 | 38 | 7.7 | 42 | 1.3 | ND | 67 | 530 |
|  | A-3 | 36 | 7.8 | 57 | 2.3 | ND | 54 | 576 |
| Comparison | B-1 | 16 | 6.7 | 420 | 44.4 | 232 | 276 | 98 |
| example | B-2 | 20 | 6.8 | 280 | 39.6 | 185 | 312 | 112 |
|  | B-3 | 23 | 7.4 | 230 | 37.2 | 54 | 128 | 325 |
|  | B-4 | 18 | 6.6 | 350 | 45.3 | 198 | 302 | 105 |

As can be seen from the results, the method for treating waste water according to the present invention provides a high removing rate of over 95% at a high BOD volume load of 1.0 kg/day.m³, compared to 77–87% for the comparison examples. The first method for treating waste water according to the present invention shows a high dephosphorization rate of over 90%, compared to below 25% for the comparison examples, which have almost no effect for dephosphorization. For subsequent denitrification process, organic nitrogen and $NH_4^+$—N must be nitrified into $NO_3^-$—N or $NO_2^-$—N. The first method for treating waste water according to the present invention provides complete nitrification even at a high $NH_4^+$—N volume load of 0.4 kg/day.m³, thereby enabling complete denitrification in the subsequent process. On the other hand, the comparison examples result in 10–30% residual $NH_4^+$—N, which cannot be removed even by an additional biological denitrification process.

TEST EXAMPLE 2

Using the same experimental system as used in the test example 1, primary-treated waste water of pig urine was treated with different contact materials obtained in the production example (4) to check the cleaning efficiency relative to the porosity of the contact material. Other test conditions were the same as in the test example 1. Measurements were made four times during operation for 2 or 3 months, and the measured values were averaged, as in the test example 1. The results are shown in Table 5.

TABLE 5

| Porosity | 36 | 48 | 61 | 75 | 82 | Primary-treated water |
|---|---|---|---|---|---|---|
| Transparency (cm) | 23 | 28 | 34 | 38 | 32 | 1 |
| pH | 8.0 | 8.0 | 7.8 | 7.7 | 7.5 | 8.3 |
| BOD (mg/l) | 163 | 96 | 48 | 38 | 68 | 1910 |
| T-P (mg/l) | 9.8 | 7.8 | 1.5 | 1.4 | 3.2 | 52.6 |
| $NH_4^+$—N (mg/l) | 54 | 23 | ND | ND | ND | 742 |
| $NO_2^-$—N (mg/l) | 218 | 132 | 78 | 72 | 122 | ND |
| $NO_3^-$—N (mg/l) | 334 | 431 | 512 | 525 | 410 | ND |

As shown in Table 5, the contact material with a porosity of 50% or more has large BOD reduction and dephosphorization effects and results in sufficient nitrification. However, when the porosity exceeds 90%, the contact material will flow out of the tanks due to floating during passing waste water, with a substantial decrease in strength of the material.

From the results, the pore structure of the contact material is extremely important for increased contact opportunity of the contact material with organic waste water and deposition of microbes in the fine pores and gaps in the contact material, and for the crystal growth of calcium hydroxyapatite, which greatly relates to the dephosphorization effect.

Test examples showing effects of the second method for treating waste water according to the present invention will now be described.

TEST EXAMPLE 3

Figure 5:
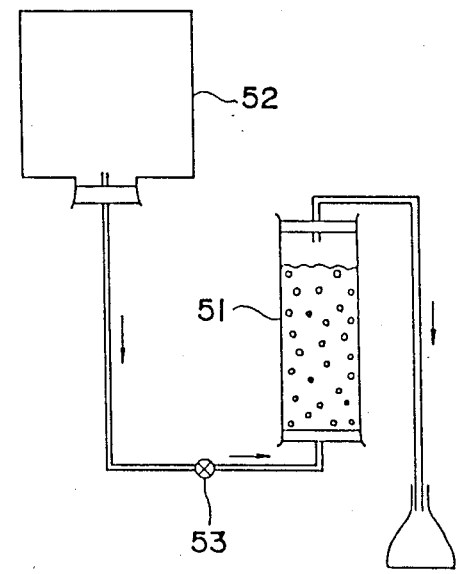
FIG. 5 is a schematic view showing a system used in test examples (test examples 3 to 6) of the second method for treating waste water according to the present invention.

Referring to FIG. 5, various porous contact materials were tested using an experimental system in which a test solution to be treated could be fed from a test solution tank 52 through a flow rate adjusting cock and passed through from the bottom of an acrylic resin column 51 of 30 mm in inner diameter and 400 mm in length which was filled with a porous contact material.

150 ml each of the contact materials produced in the production examples (5) to (7) above were placed in the columns 51 and used as test columns C-1, C-2, and C-3, respectively. Different test solutions shown in Table 6 were passed through the test columns at a flow rate of 300 ml/hr and, after a 1-week operation, the treated water was measured for pH and phosphate ion concentration. The results are shown in Table 6.

To prepare the test solutions, potassium dihydrogen phosphate ($KH_2PO_4$) was dissolved in pure water and the phosphorus concentration was adjusted to 5 mg/liter, the calcium ion concentration was varied in the range from 0 to 100 mg/liter by adding an aqueous solution of calcium chloride ($CaCl_2.2H_2O$), and the pH value was varied in the range from 5 to 10 by adding an aqueous solution of sodium hydroxide (NaOH).

For comparison, 150 ml of rock phosphate produced in Angaur Islands of 2.5–5 mm in particle size was placed in the same column (test column D-1), and tested under the same conditions. The test results of the test column D-1 are also shown in Table 6.

Figure 6:
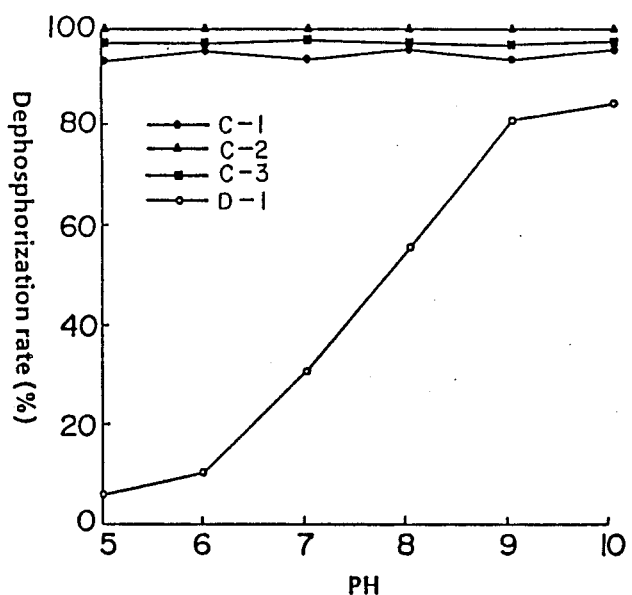
FIG. 6 is a graph showing relationship between the dephosphorization rate and pH of the test solution in a test example 3.
Figure 7:
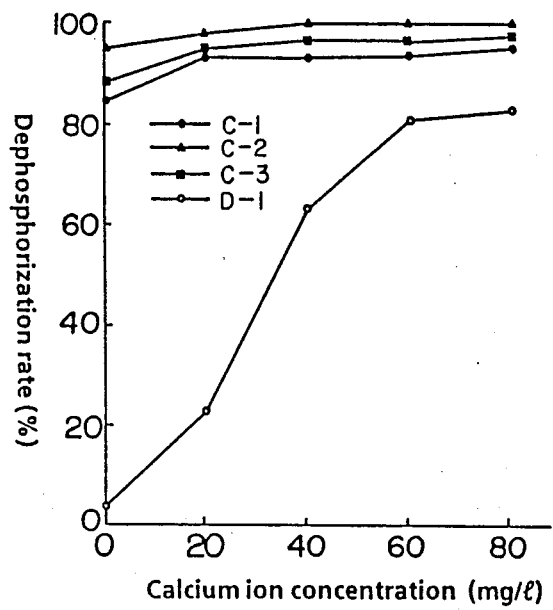
FIG. 7 is a graph showing relationship between the dephosphorization rate and calcium ion concentration of the test solution in the test example 3.

Further, the effect of pH of the test solutions (with a constant $Ca^{2+}$ concentration of 60 mg/liter) on the dephosphorization rate is shown in FIG. 6, and the effect of calcium in concentration (with a constant pH value of 9) on the dephosphorization rate is shown in FIG. 7.

TABLE 6

| Column | | Test example | | | | | | | | Comparison | | |
|---|---|---|---|---|---|---|---|---|---|---|---|---|
| | | C-1 | | | C-2 | | | C-3 | | D-1 | | |
| Solution | | | | | | | | | | | | |
| $Ca^{2+}$ conc. (mg/l) | pH | pH | $PO_4^{3-}$—P (mg/l) | Dephos. (%) | pH | $PO_4^{3-}$—P (mg/l) | Dephos. (%) | pH | $PO_4^{3-}$—P (mg/l) | Dephos. (%) | pH | $PO_4^{3-}$—P (mg/l) | Dephos. (%) |
| | 5 | 9.00 | 0.95 | 81.0 | 8.90 | 0.38 | 92.4 | 8.92 | 0.68 | 86.4 | 5.68 | 4.70 | 6.0 |

TABLE 6-continued

| Column | | Test example | | | | | | | | | Comparison | | |
| --- | --- | --- | --- | --- | --- | --- | --- | --- | --- | --- | --- | --- | --- |
| Solution | | C-1 | | | C-2 | | | C-3 | | | D-1 | | |
| $Ca^{2+}$ conc. (mg/l) | pH | pH | $PO_4^{3-}$—P (mg/l) | Dephos. (%) | pH | $PO_4^{3-}$—P (mg/l) | Dephos. (%) | pH | $PO_4^{3-}$—P (mg/l) | Dephos. (%) | pH | $PO_4^{3-}$—P (mg/l) | Dephos. (%) |
|  | 6 | 9.23 | 0.83 | 83.4 | 8.88 | 0.30 | 94.0 | 8.85 | 0.59 | 88.2 | 6.13 | 4.89 | 2.2 |
| 0 | 7 | 9.35 | 0.90 | 82.0 | 8.95 | 0.32 | 93.6 | 8.97 | 0.62 | 87.6 | 7.02 | 4.52 | 9.6 |
|  | 8 | 9.50 | 0.86 | 82.8 | 9.02 | 0.29 | 94.2 | 9.35 | 0.53 | 89.4 | 7.84 | 4.90 | 2.0 |
|  | 9 | 9.83 | 0.78 | 84.4 | 9.53 | 0.25 | 95.0 | 9.58 | 0.60 | 88.0 | 8.78 | 4.78 | 4.4 |
|  | 10 | 10.75 | 0.82 | 83.6 | 10.30 | 0.30 | 94.0 | 10.42 | 0.70 | 87.0 | 9.87 | 4.82 | 3.6 |
|  | 5 | 9.21 | 0.34 | 93.2 | 8.73 | 0.12 | 97.6 | 8.68 | 0.29 | 94.2 | 5.72 | 4.82 | 3.6 |
|  | 6 | 9.33 | 0.30 | 94.0 | 8.86 | 0.11 | 97.8 | 8.82 | 0.26 | 94.8 | 6.01 | 4.81 | 3.8 |
| 20 | 7 | 9.30 | 0.38 | 92.4 | 8.75 | 0.12 | 97.6 | 8.85 | 0.31 | 93.8 | 6.87 | 4.55 | 9.0 |
|  | 8 | 9.55 | 0.24 | 95.2 | 8.98 | 0.10 | 98.0 | 9.23 | 0.25 | 95.0 | 7.32 | 4.02 | 19.9 |
|  | 9 | 9.70 | 0.30 | 94.0 | 9.35 | 0.10 | 98.0 | 9.45 | 0.28 | 94.4 | 8.55 | 3.87 | 22.6 |
|  | 10 | 10.65 | 0.25 | 95.0 | 10.28 | 0.14 | 97.2 | 10.50 | 0.35 | 93.0 | 9.52 | 3.93 | 21.4 |
|  | 5 | 9.13 | 0.53 | 89.4 | 8.63 | ND | 100 | 8.38 | 0.19 | 96.2 | 5.65 | 4.65 | 7.0 |
|  | 6 | 9.28 | 0.42 | 91.6 | 8.58 | ND | 100 | 8.72 | 0.22 | 95.6 | 6.12 | 4.72 | 5.6 |
| 40 | 7 | 9.33 | 0.28 | 94.4 | 8.89 | ND | 100 | 8.60 | 0.23 | 95.4 | 6.78 | 3.93 | 21.4 |
|  | 8 | 9.80 | 0.25 | 95.0 | 8.73 | ND | 100 | 8.92 | 0.20 | 96.0 | 7.28 | 2.75 | 45.0 |
|  | 9 | 9.80 | 0.32 | 93.6 | 9.23 | ND | 100 | 9.40 | 0.18 | 96.4 | 8.55 | 1.85 | 63.0 |
|  | 10 | 10.70 | 0.23 | 95.4 | 10.30 | ND | 100 | 10.38 | 0.20 | 96.0 | 9.58 | 1.53 | 69.4 |
|  | 5 | 9.05 | 0.38 | 92.4 | 8.72 | ND | 100 | 8.72 | 0.18 | 96.4 | 5.70 | 4.73 | 5.4 |
|  | 6 | 9.23 | 0.25 | 95.0 | 8.87 | ND | 100 | 8.80 | 0.20 | 96.0 | 6.13 | 4.50 | 10.0 |
| 60 | 7 | 9.28 | 0.32 | 93.6 | 8.95 | ND | 100 | 8.65 | 0.15 | 97.0 | 6.72 | 3.48 | 30.4 |
|  | 8 | 9.55 | 0.22 | 95.6 | 8.80 | ND | 100 | 8.90 | 0.16 | 96.8 | 7.21 | 2.21 | 55.8 |
|  | 9 | 9.78 | 0.30 | 94.0 | 9.35 | ND | 100 | 9.30 | 0.20 | 96.0 | 8.32 | 0.98 | 80.4 |
|  | 10 | 10.65 | 0.23 | 95.4 | 10.23 | ND | 100 | 10.42 | 0.15 | 97.0 | 9.48 | 0.77 | 84.6 |
|  | 5 | 9.10 | 0.31 | 93.8 | 8.55 | ND | 100 | 8.72 | 0.22 | 95.6 | 5.82 | 4.78 | 4.4 |
|  | 6 | 9.23 | 0.28 | 94.6 | 8.65 | ND | 100 | 8.80 | 0.18 | 96.4 | 6.00 | 4.62 | 7.6 |
| 80 | 7 | 9.30 | 0.35 | 93.0 | 8.83 | ND | 100 | 8.93 | 0.21 | 95.8 | 6.62 | 3.61 | 27.8 |
|  | 8 | 9.75 | 0.28 | 94.4 | 9.01 | ND | 100 | 9.00 | 0.15 | 97.0 | 7.38 | 2.03 | 59.4 |
|  | 9 | 9.83 | 0.25 | 95.0 | 9.22 | ND | 100 | 9.58 | 0.17 | 96.4 | 8.25 | 0.85 | 83.0 |
|  | 10 | 10.38 | 0.27 | 94.6 | 10.20 | ND | 100 | 10.32 | 0.17 | 96.4 | 9.31 | 0.78 | 84.4 |

As shown in the Table, using the second method for treating waste water according to the present invention, the pH value of treated water is maintained at about 9-10 even with varying pH value of the test solution, and a dephosphorization rate of over 80% is always obtained. In the comparison examples, on the other hand, the dephosphorization rate does not attain 80% unless the pH value of the test solution is over 8.5. Moreover, with the second method for treating waste water according to the present invention, a dephosphorization rate of over 80% can be obtained even with a $Ca^{2+}$ concentration of zero in the test solution, whereas, in the comparison examples, no substantial dephosphorization effect is obtained with a $Ca^{2+}$ concentration of below about 60 mg/l. In the second method for treating waste water according to the present invention, the presence of $Ca^{2+}$ ions in the test solution results in further enhanced dephosphorization rate, and, a dephosphorization rate of nearly 100% is obtained using the tobermorite contact material with a $Ca^{2+}$ concentration of 40 mg/l (A-2).

TEST EXAMPLE 4

Using the same experimental system as used in the test example 3, a test solution containing 5 mg/l of phosphorus with no calcium ion added, having a pH value of 7, was treated using different contact materials shown in the production examples (8) and (9) to test the dephosphorization rate relative to the porosity of the contact material. Other test conditions were the same as in the test example 3. The results are shown in Table 7 and FIG. 8.

TABLE 7

| Contact material | | Tobermorite | | | | | | Xonotlite | | | |
| --- | --- | --- | --- | --- | --- | --- | --- | --- | --- | --- | --- |
| Porosity (%) | | 36 | 48 | 61 | 75 | 82 | 88 | 65 | 73 | 85 | 91 |
| Treated water | $PO_4^{3-}$—P (mg/l) | 1.58 | 1.21 | 0.28 | 0.32 | 0.56 | 1.05 | 0.50 | 0.46 | 0.62 | 1.38 |
|  | Dephos. | 68.4 | 75.8 | 94.4 | 93.6 | 88.8 | 79.0 | 90.0 | 90.8 | 87.6 | 72.4 |

Figure 8:
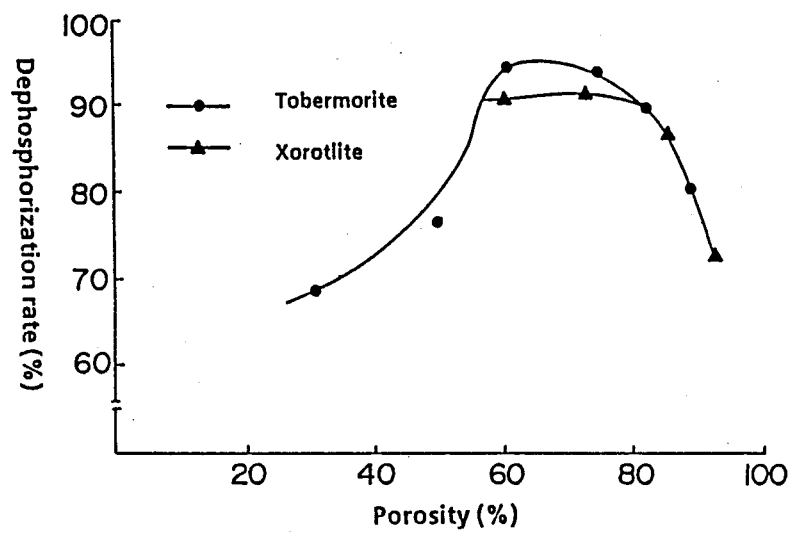
FIG. 8 is a graph showing relationship between the dephosphorization rate and porosity of the treating material in a test example 4.

As shown in Table 7 and FIG. 8, high dephosphorization rates are obtained when the porosity of the contact material is 50-90%. When the porosity of the contact material exceeds 90%, there occurs a reduction in dephosphorization rate due to floating of the contact material during passing water, with a considerable decrease in strength. From the results, it was found that the pore structure of the contact material enhanced the contact opportunity of the contact material with phosphate ions and was extremely important for the growth of calcium hydroxyapatite crystals in the gaps, thus greatly contributing to dephosphorization effect.

TEST EXAMPLE 5

Using the same experimental system as used in the test example 3, a test solution containing 5 mg/l of phosphorus with no calcium ion added, having a pH value of 7, was treated using five types of tobermorite contact materials obtained in the production example (6) having different particle sizes of 0.6-1.2, 1.2-2.5, 2.5-5, 5-10, and 10-15 mm, respectively, to test the dephosphorization rate relative to the particle size of the contact material. Other test conditions were the same as in the test example 3. The results are shown in FIG. 9.

Figure 9:
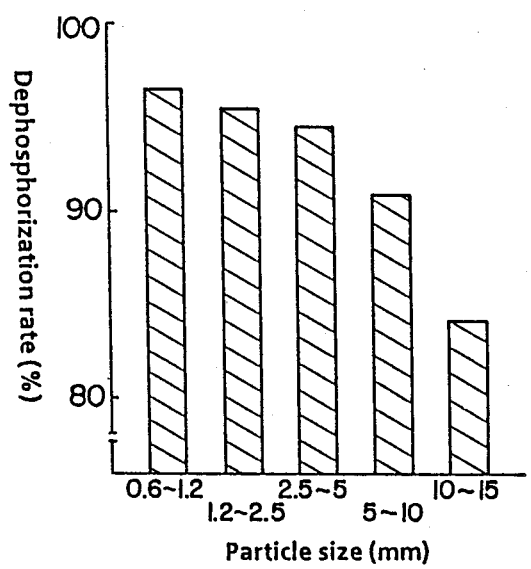
FIG. 9 is a graph showing relationship between the dephosphorization rate and particle size of the treating material in a test example 5.

As shown in FIG. 9, the dephosphorization rate decreased as the particle size of the contact material increased. The contact material having a particle diameter of less than 0.5 mm resulted in clogging due to swelling of the contact material associated with solid substances and deposition of crystals, which unabled use for long time.

TEST EXAMPLE 6

Using the same experimental system as used in the test example 3, test solutions shown in Table 8 were treated at different flow rates of 1,800 ml/day (12 tons/day.m$^3$), 900 ml/day (6 tons/day.m$^3$), 300 ml/day (2 tons/day.m$^3$), 150 ml/day (1 ton/day.m$^3$), and 75 ml/day (0.5 ton/day.m$^3$), respectively, using the tobermorite contact material obtained in the production example (6) to test the dephosphorization rate relative to the phosphorus concentration and flow rate of the test solution. Other test conditions were the same as in the test example 3. The results are shown in Table 8.

TABLE 8

| Flow rate | | 12t/day · m$^3$ | | 6t/day · m$^3$ | | 2t/day · m$^3$ | | 1t/day · m$^3$ | | 0.5t/day · m$^3$ | |
|---|---|---|---|---|---|---|---|---|---|---|---|
| Conc. of treated water and dephos. rate | | PO$_4^{3-}$—P (mg/l) | Dephos. (%) | PO$_4^{3-}$—P (mg/l) | Dephos. (%) | PO$_4^{3-}$—P (mg/l) | Dephos. (%) | PO$_4^{3-}$—P (mg/l) | Dephos. (%) | PO$_4^{3-}$—P (mg/l) | Dephos. (%) |
| P-conc. of test solution (mg/l) | 500 | 487.1 | 2.6 | 452.3 | 9.5 | 268.8 | 46.2 | 5.85 | 98.8 | 1.22 | 99.8 |
| | 50 | 8.43 | 83.1 | 2.03 | 95.9 | 0.69 | 98.6 | 1.02 | 98.0 | 0.61 | 98.9 |
| | 5 | 0.42 | 91.6 | 0.33 | 93.4 | 0.32 | 93.6 | 0.25 | 95.0 | 0.35 | 93.0 |

As shown in Table 8, using the second method for treating waste water according to the present invention, even a solution having a high phosphorus concentration of 500 mg/l can be treated with a high efficiency by decreasing the flow rate.

Preferred embodiments of the first and second methods for treating waste water according to the present invention when applied to an actual pigsty waste water (mixture of pig excreta and washing water from pigsty) will now be described.

FIRST EMBODIMENT

Figure 10:
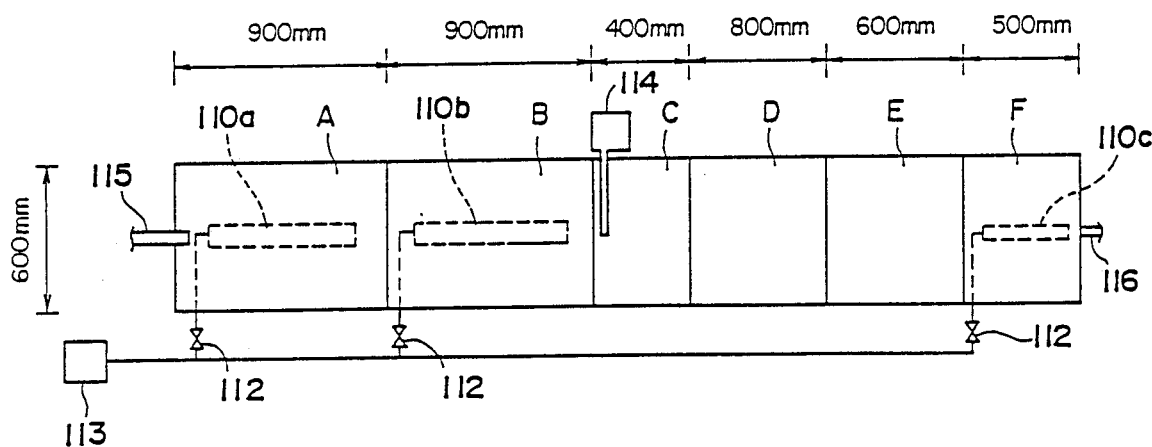
FIG. 10 and FIG. 11 are an up-view and a front view, respectively, of a waste water treatment system used in a first embodiment of the present invention.
Figure 11:
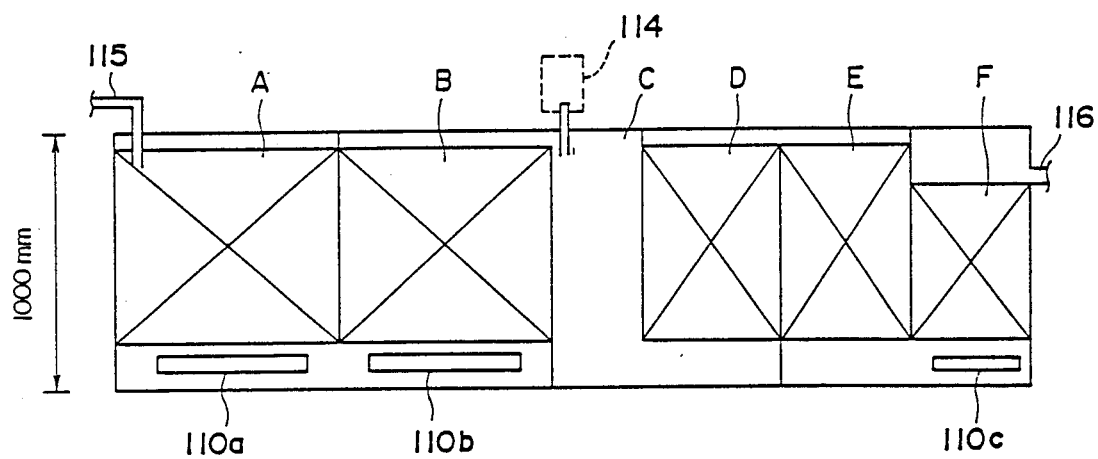

In a first embodiment of the present invention, a concrete waste water treatment system consisting of six treating chamber A to F as shown in FIG. 10 and FIG. 11 was used. In the figures, symbols A, B and F are aerobic filter bed tanks, of which A and B are filled with a porous contact material consisting mainly of tobermorite of 5-15 mm in particle diameter produced using the same method as in the production example (2) and F is filled with the tobermorite contact material of 5-8 mm in particle diameter, with air-blowing pipes 110a to 110c for aeration disposed at the bottoms of individual tanks. The air-blowing pipes 110a to 110c are respectively connected to an air pump 113 through air pipes 111 and air adjusting valves 112. The treating chamber C is an agitation tank which is supplied with methanol from a methanol tank 114. D and E are anaerobic filter bed tanks which are filled with a commercial anthracite of 5-10 mm in particle diameter.

With such an arrangement of the waste water treatment system, primary-treated pigsty waste water (solid-liquid separated) was introduced from a waste water inlet pipe 115 at a rate of 600 liters/day, and the treated water was discharged from a discharge pipe 116. The treating chamber was supplied with methanol at a rate of 1.2 liter/day.

Figure 12:
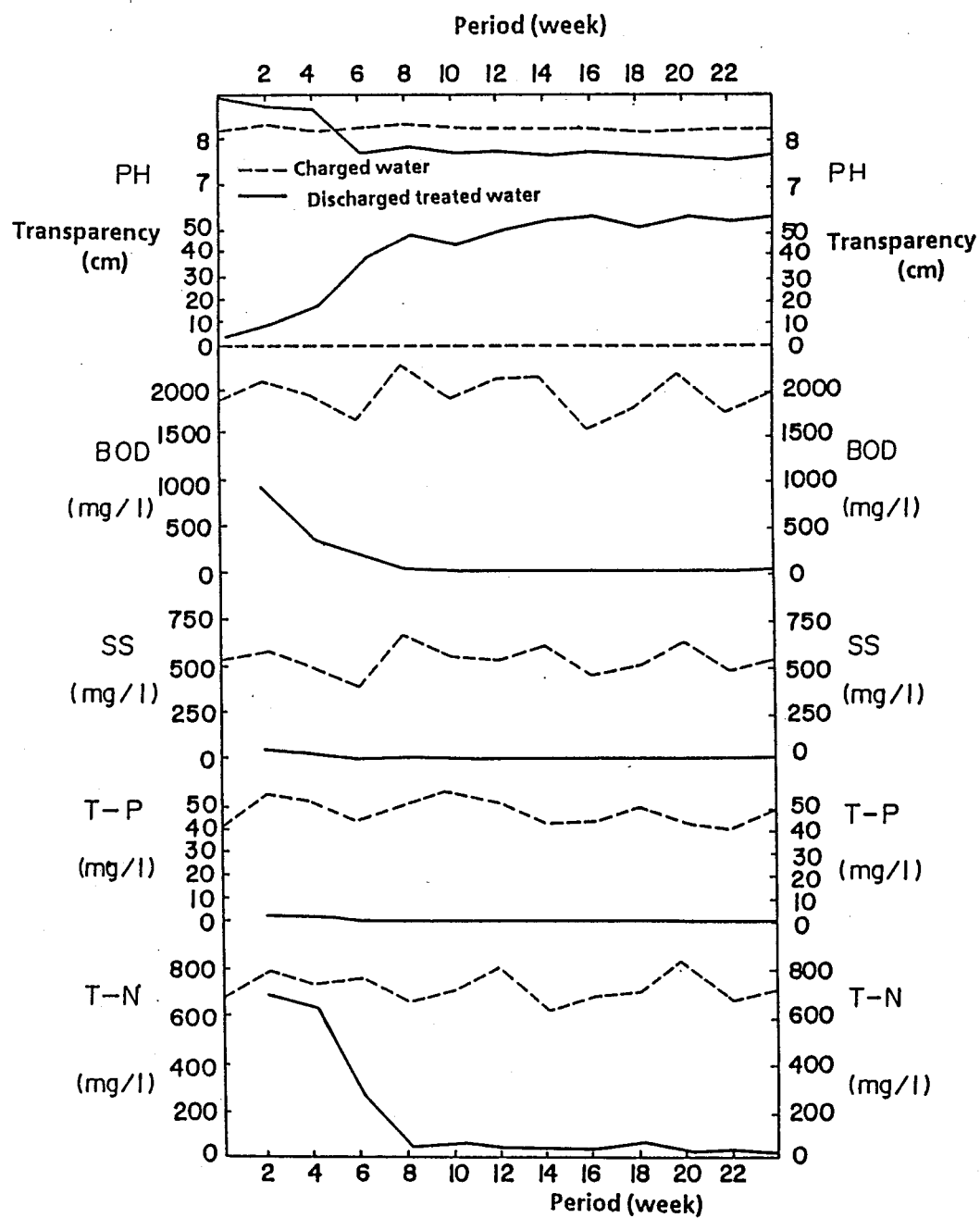
FIG. 12 is a graphic showing results of the first embodiment of the present invention.

Under the above conditions, the waste water treatment system was operated for 6 months, and pH, transparency, BOD, SS, T-P, and T-N (total nitrogen) of the primary-treated waste water and discharged treated water were measured. The results are shown in FIG. 12. As can be seen from FIG. 12, organic substances, phosphorus and nitrogen in the pigsty waste water are positively removed for an extended period of time.

SECOND EMBODIMENT

Figure 13:
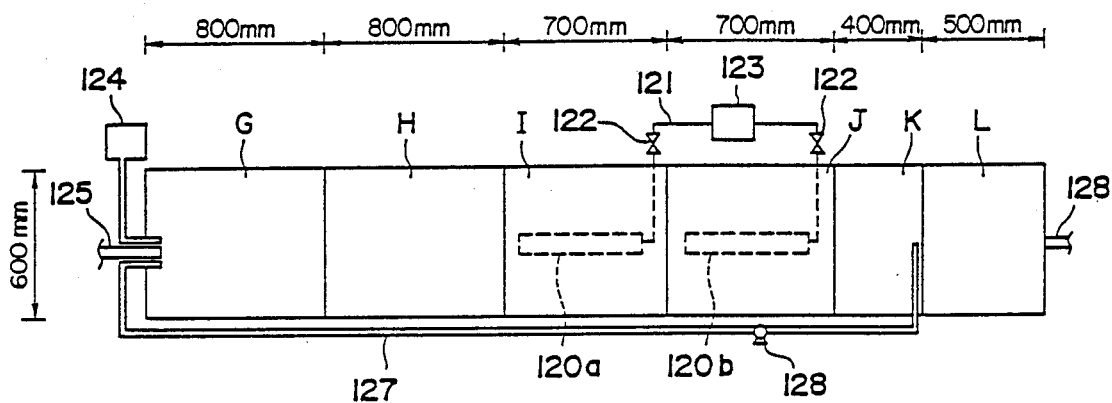
FIG. 13 and FIG. 14 are an up-view and a front view, respectively, of a waste water treatment system used in a second embodiment of the present invention.
Figure 14:
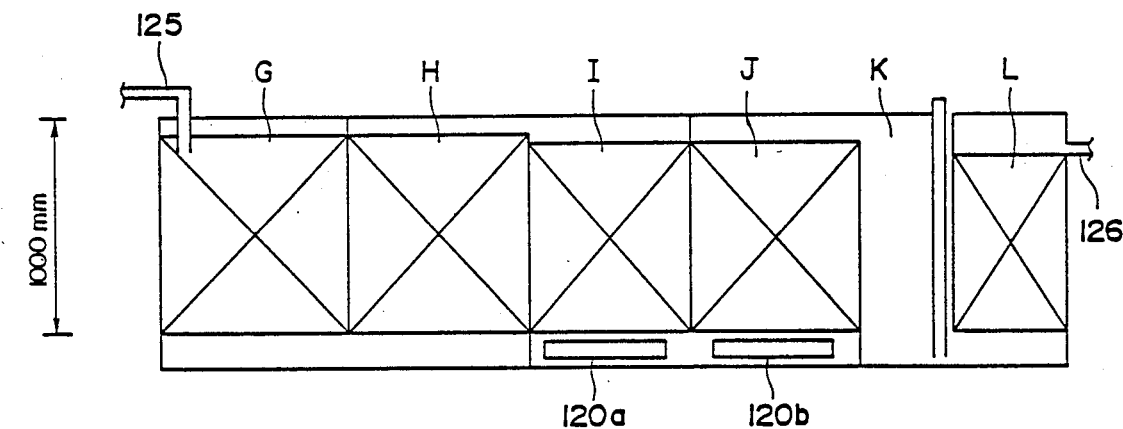

In a second embodiment of the present invention, a concrete waste water treatment system consisting of six treating chambers G to L as shown in FIG. 13 and FIG. 14 was used. In the figures, symbols I and J indicate aerobic filter bed tanks which are filled with a porous contact material consisting mainly of tobermorite of 5-10 mm in particle diameter produced using the same method as in the production example (2), with air-blowing pipes 120a and 120b for aeration disposed at the bottoms of the individual tanks. The air-blowing pipes 120a and 120b are respectively connected to an air pump 123 through air pipes 121 and air adjusting valves 122. The treating chambers G and H are anaerobic filter bed tanks which are filled with a commercial anthracite of 5-15 mm in particle diameter, and supplied with waste water from a waste water inlet pipe 125 and with methanol from a methanol tank 124. The waste water passed through the treating chambers G and H is treated in the aerobic filter bed tanks I and J and then recirculated to the treating chamber G from the treating chamber K through a recirculation water inlet pipe 127 and a recirculation pump 128. A re-anaerobic tank L is disposed after the treating chamber K, which is filled with anthracite as for the treating chambers G and H.

Figure 15:
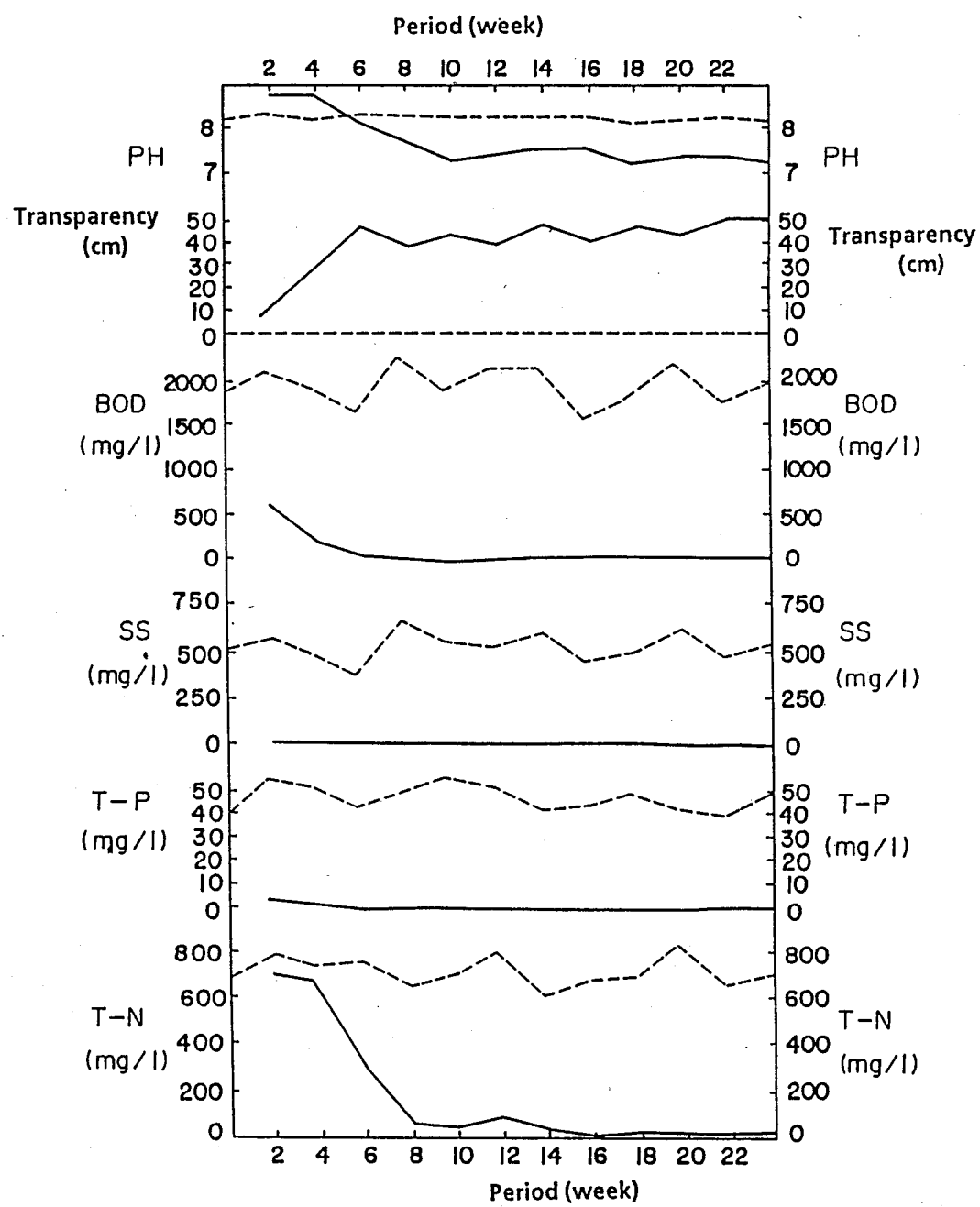
FIG. 15 is a graphic showing results of the second embodiment of the present invention.

With such an arrangement of the waste water treatment system, primary-treated pigsty waste water was supplied from the waste water inlet pipe 125 at a rate of 600 liters/day, with a recirculation rate of 5,400 liters/day from the treating chamber K to the treating chamber G. Since the waste water had a high nitrogen concentration and was not sufficiently denitrogenated with only the BOD source contained in the waste water, the anaerobic tank G was supplied with methanol as a hydrogen donor at a rate of 0.2 liter/day. Under the above conditions, the waste water treatment system was operated for 6 months, and pH, transparency, BOD, SS, T-P, and T-N of the primary-treated waste water and treated water discharged from a discharge pipe 126 were measured. The results are shown in FIG. 15. As can be seen from FIG. 15, with the second embodiment of the present invention, organic substances, phosphorus and nitrogen in the pigsty waste water are positively removed for an extended period of time.

The results of the first and second embodiments of the present invention will now be further examined in detail.

In the first and second embodiments, as shown in FIG. 12 and FIG. 15, the treatment advances from about the fourth week, and the quality of the treated water stabilizes after the eighth week. The measured results of the quality of the treated water after the eighth week are averaged and shown in Table 9.

TABLE 9

|  | Inlet water | Embodiment 1 | | Embodiment 2 | |
| --- | --- | --- | --- | --- | --- |
|  |  | Treated water | Removal (%) | Treated water | Removal (%) |
| pH | 8.3 | 7.7 | — | 7.5 | — |
| Transparency (cm) | 1 | 53 | — | 48 | — |
| BOD (mg/l) | 1980 | 16 | 99.1 | 12 | 99.4 |
| SS (mg/l) | 570 | 12 | 97.9 | 14 | 97.5 |
| T-P (mg/l) | 49.4 | 1.5 | 97.0 | 1.2 | 97.6 |
| T-N (mg/l) | 719 | 38 | 94.7 | 49 | 93.2 |

As shown in Table 9, both the first and second embodiments of the present invention show high removal rates for BOD, SS, T-P, and T-N, providing very satisfactory results.

For heavy metals, the inlet waste water and the treated water at the 20th week were measured in the first embodiment, and the results are shown in Table 10.

TABLE 10

|  | Inlet water | Treated water | Removal (%) |
| --- | --- | --- | --- |
| Cu (mg/l) | 0.45 | 0.04 | 91.1 |
| Zn (mg/l) | 1.0 | 0.01> | 100 |
| Pd (mg/l) | 0.01> | 0.01> | — |

As shown in Table 10, copper and zinc contained in the pigsty waste water were removed with removal rates of over 90% in the first embodiment of the present invention.

THIRD EMBODIMENT 100 liters of a contact material consisting mainly of tobermorite of 5–8 mm in particle diameter produced using the same method as in the production example (6) was placed in a dephosphorization tank with dimensions of 400×400×800 mm. Primary-treated water of pigsty waste water was passed in the upward direction at a flow rate of 120 liters/day (1.2 ton/day.m$^3$). Phosphorus concentrations of the pigsty waste water and the treated water were measured over a period of 7 months. The results are shown in FIG. 16.

Figure 16:
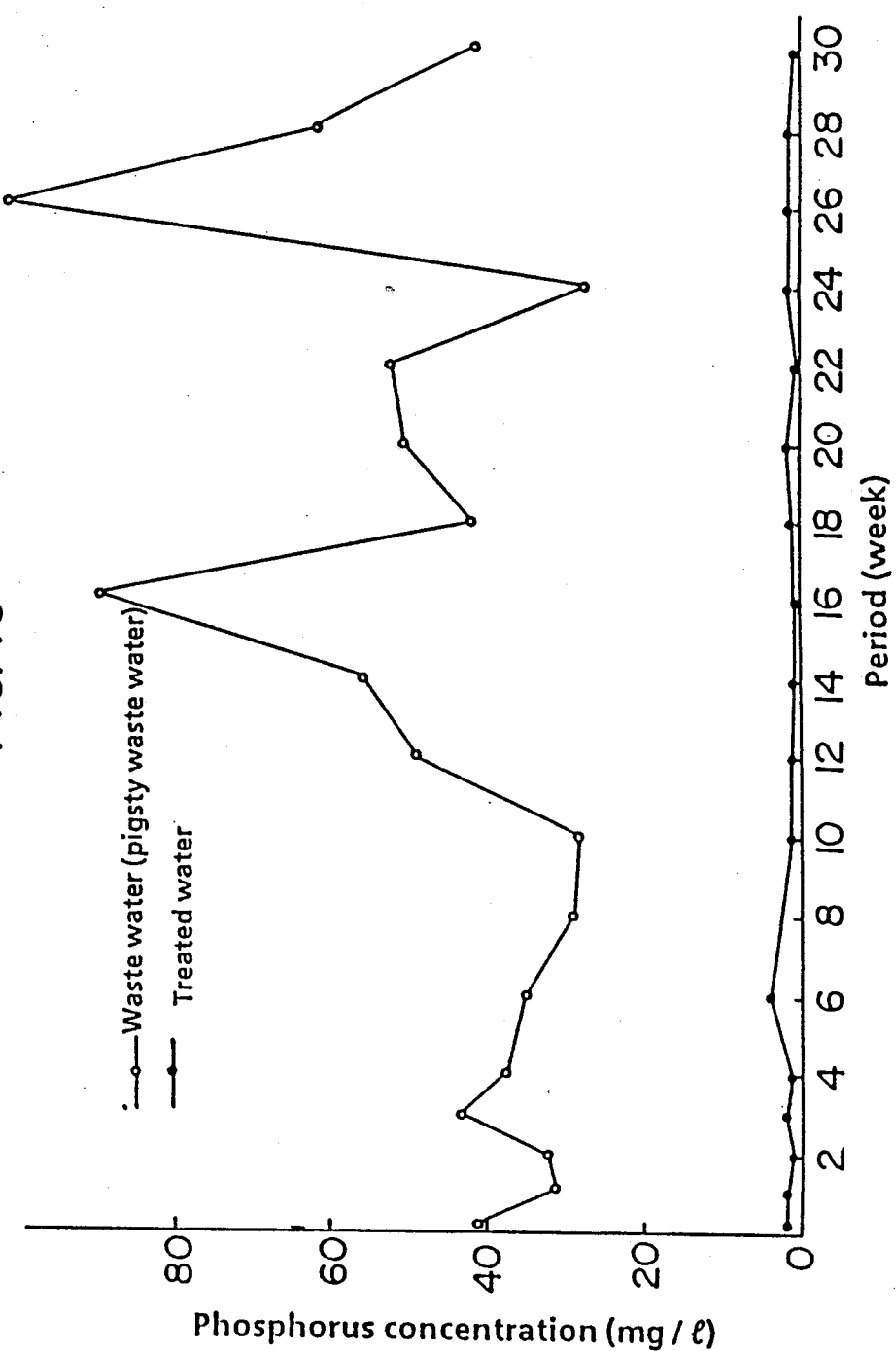
FIG. 16 is a graph showing results of a third embodiment of the present invention.
Figure 17:
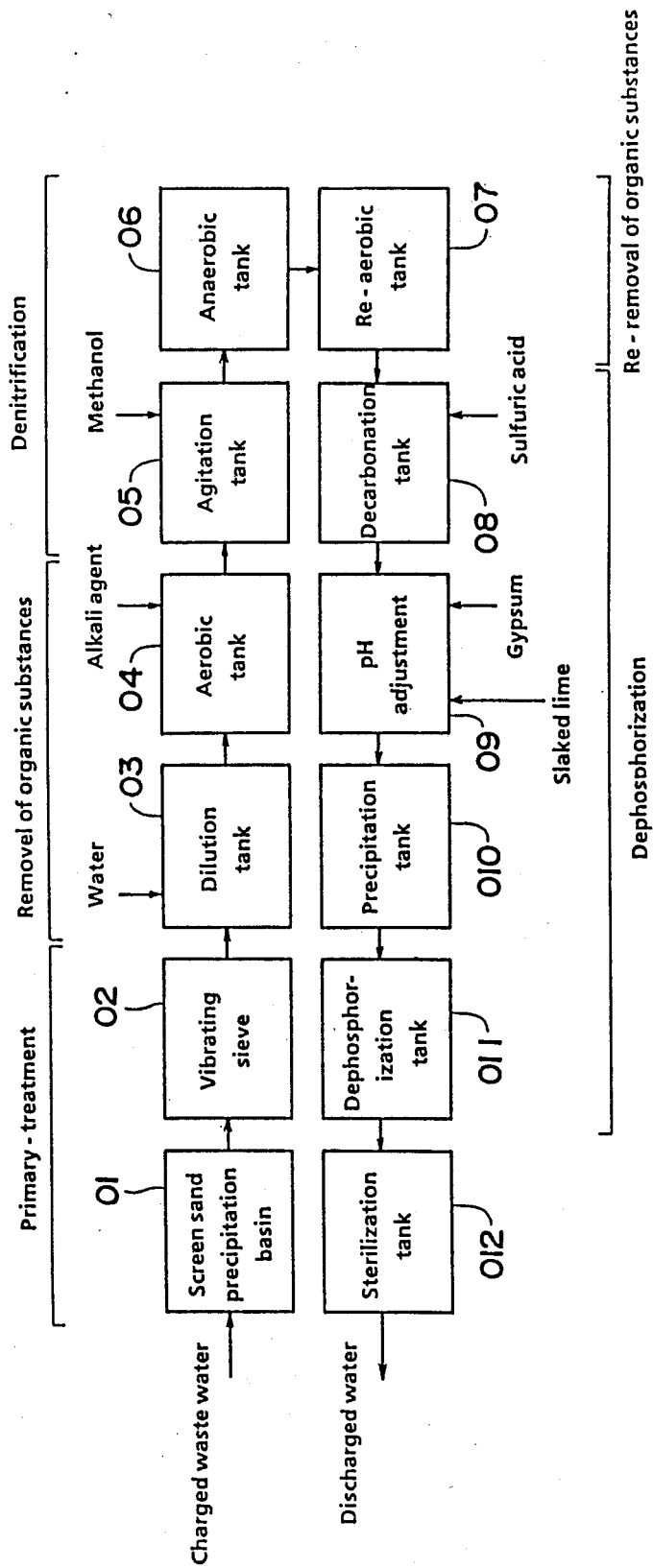
FIG. 17 is a process flow sheet showing a prior art process for treating organic waste water.
Figure 18:
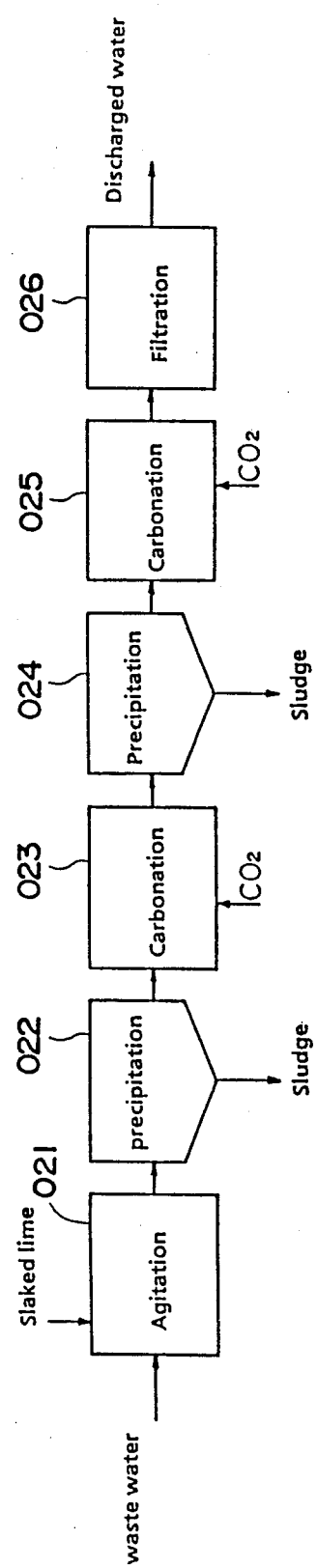
FIG. 18 is a process flow sheet showing a prior art flocculation/precipitation method.
Figure 19:
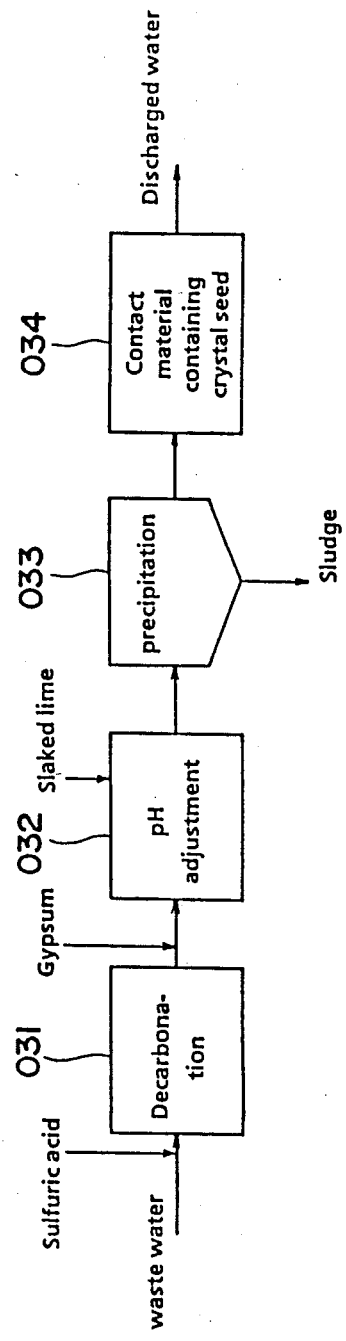
FIG. 19 ia a process flow sheet showing a prior art crystallization method.

As shown in FIG. 16, the phosphorus concentration of the treated water is consistently below 3 ppm, regardless of the phosphorus concentration of the pigsty waste water. Thus, the second method for treating waste water according to the present invention provides a stable dephosphorization effect over an extended period of time.

INDUSTRIAL APPLICABILITY

As described above, the first method for treating waste water according to the present invention provides efficient removal of organic substances, nitrogen and phosphorus using a simple and easy procedure without need for complicated processes. Thus, the method is ideally suitable for treating high-concentration waste water such as animal urine and factory waste water at a high load. The porous contact material used for a long time and thus having a reduced treating ability can be reused as a silica-lime-based fertilizer and a soil improving material.

The second method for treating waste water according to the present invention can efficiently remove phosphorus using a simple and easy procedure with easy maintenance and control, and is therefore suitable for dephosphorization of factory waste water and sewage, as well as for medium-to-small-scale dephosphorization treatment, which has formerly been difficult to perform, such as for animal urine and miscellaneous home waste water. The porous contact material used for a long time and thus having a reduced treating ability can be reused as a silica-lime-based fertilizer, phosphorus fertilizer, or a raw material for the production of phosphorus.

We claim:

1. A method of treating raw water containing phosphorus compounds, nitrogen compounds, and organic substances comprising passing said raw water through an aerobic zone containing a porous contact material, thereby contacting said water with said porous material in the presence of air to produce aerobically treated water, contacting said aerobically treated water with a hydrogen donor under substantially anaerobic conditions to produce anaerobically treated water, said porous contact material comprising tobermorite, xonotlite or a mixture thereof, and having a porosity of 50% to 90%, said porous contact material being produced by foaming and hardening an aqueous slurry which comprises a silica-based material, a lime-based material and water in the presence of a foaming agent to form a porous product, then subjecting said porous product to hydrothermal synthesis, wherein the order of said passing and said contacting is reversible and said aerobically treated water and said anaerobically treated water may be blended with said raw water and be recycled.

2. The method of claim 1 wherein said foaming agent is aluminum powder.

3. The method of claim 1 wherein said porous contact material is crushed.

4. The method of claim 1 wherein said porous contact material is in the form of pellets.

5. The method of claim 1 wherein said porous contact material has a particle size of 0.5 to 10 mm.

6. A method of treating water containing phosphorus compounds comprising passing said water through a treatment zone containing a porous contact material, said porous material comprising tobermorite, xonotlite or a mixture thereof and having a porosity of 50% to 90%, said porous material being produced by foaming and hardening an aqueous slurry which comprises silica-based material, lime-based material and water in the presence of a foaming agent to form a porous product, and then subjecting said porous product to hydrothermal synthesis.

7. The method of claim 6 wherein said foaming agent is aluminum powder.

8. The method of claim 6 wherein said porous contact material is crushed.

9. The method of claim 6 wherein said porous contact material is in the form of pellets.

10. The method of claim 6 wherein said porous contact material has a particle size of 0.5 to 10 mm.

* * * * *